US010341343B2

(12) United States Patent
Bauer et al.

(10) Patent No.: US 10,341,343 B2
(45) Date of Patent: *Jul. 2, 2019

(54) EFFICIENT AND SECURE CONNECTION OF DEVICES TO A NETWORK WITHOUT USER INTERFACES

(71) Applicant: International Business Machines Corporation, Armonk, NY (US)

(72) Inventors: Daniel N. Bauer, Birmensdorf (CH); Gero Dittmann, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/799,488

(22) Filed: Oct. 31, 2017

(65) Prior Publication Data
US 2018/0270231 A1 Sep. 20, 2018

Related U.S. Application Data

(63) Continuation of application No. 15/458,454, filed on Mar. 14, 2017.

(51) Int. Cl.
*H04L 29/00* (2006.01)
*H04L 29/06* (2006.01)
*H04W 12/00* (2009.01)

(52) U.S. Cl.
CPC ...... *H04L 63/0876* (2013.01); *H04L 63/0435* (2013.01); *H04L 63/0442* (2013.01); *H04L 63/061* (2013.01); *H04W 12/003* (2019.01); *H04L 63/0823* (2013.01); *H04W 12/00512* (2019.01); *H04W 12/00522* (2019.01)

(58) Field of Classification Search
CPC ............ H04L 63/0876; H04L 63/0435; H04L 63/0442; H04L 63/061
See application file for complete search history.

(56) References Cited

U.S. PATENT DOCUMENTS

2010/0306359 A1* 12/2010 Dehaan ................. G06F 9/4416
709/223
2013/0239192 A1* 9/2013 Linga ...................... G06F 21/44
726/7

(Continued)

OTHER PUBLICATIONS

Bauer et al., "Connecting Devices to a Network," U.S. Appl. No. 15/458,454, filed Mar. 14, 2017.

(Continued)

*Primary Examiner* — Morshed Mehedi
(74) *Attorney, Agent, or Firm* — Cantor Colburn LLP; Daniel Morris

(57) ABSTRACT

Embodiments of the invention is directed to a method for connecting a device to a network. An example method comprises providing a device assigned with a device identifier and an asymmetric cryptographic key pair that includes a public key and a private key. The device stores the private key on a memory thereof. The device is provided with information as to the assigned device identifier and/or the public key. This information is detectable by a detector so as to be transmissible to a server for it to identify the device identifier and the public key assigned to the device.

16 Claims, 5 Drawing Sheets

(56) References Cited

U.S. PATENT DOCUMENTS

| | | | | |
|---|---|---|---|---|
| 2014/0373115 A1* | 12/2014 | Hartman | ................ | G06F 21/31 |
| | | | | 726/6 |
| 2015/0264731 A1* | 9/2015 | Lin | ................ | H04L 67/26 |
| | | | | 455/41.2 |
| 2016/0112257 A1* | 4/2016 | Hardy | ................ | H04L 41/0806 |
| | | | | 709/222 |
| 2016/0182459 A1* | 6/2016 | Britt | ................ | H04L 67/12 |
| | | | | 713/171 |
| 2016/0295404 A1* | 10/2016 | Gouget | ................ | H04L 63/0853 |
| 2017/0078265 A1* | 3/2017 | Sundaresh | ................ | G06F 21/45 |

OTHER PUBLICATIONS

List of IBM Patents or Patent Applications Treated as Related; Date Filed: Oct. 31, 2017, 2 pages.

* cited by examiner

EFFICIENT AND SECURE CONNECTION OF DEVICES TO A NETWORK WITHOUT USER INTERFACES

DOMESTIC PRIORITY

This application is a continuation of U.S. application Ser. No. 15/458,454, filed Mar. 14, 2017, the contents of which are incorporated by reference herein in its entirety.

BACKGROUND

Usual authentication methods for granting network access to (wireless or wired) devices typically rely on: (i) a pre-shared key (or PSK) that is the same for all users and devices or (ii) user-specific credentials (e.g., cryptographic key, or user ID and password).

A disadvantage of using a PSK is that it cannot be revoked for individual users or devices. A user can even pass it on to other users unbeknown to the network operator. Also, a PSK need be configured in each device that needs network access. Changing the PSK requires to update it in all devices. Nevertheless, the prevalent authentication methods for residential networks today rely on a PSK.

On the other hand, using user-specific credentials is a common authentication method in enterprise networks. User-specific credentials require an authentication server for user management, a thing that is usually too burdensome for most private households. Each user who wants to access the network needs an account with credentials on the authentication server and the user needs to configure the credentials in each of her/his devices. Guests typically do not have accounts on the server, so that a new account must be created for each guest, who then needs to enter credentials in each of their devices.

Granting Internet-of-Things devices (IoT devices) access to a network (e.g., a wireless network) typically involves configuring credentials on the device. This can be achieved using a laptop, tablet or smartphone. However, such operations are burdensome. This is all the more true for IoT devices that do not have any user interface (UI). For industrial-scale deployments, individually configuring network credentials on large numbers of IoT devices becomes prohibitively time-consuming and thus expensive.

Therefore, there is a need for methods and systems by which devices can easily be connected to a network and which enable a quick deployment.

SUMMARY

Embodiments of the invention are directed to a method for connecting a device to a network. This example method relies on a device assigned with a device identifier and an asymmetric cryptographic key pair (i.e., which includes a public key and a private key). The private key is stored on a memory of the device. The device is provided with information as to the assigned device identifier and/or the public key. This information is detectable by a detector so as to be transmissible to a server for it to identify the device identifier and the public key assigned to the device. The method comprises, at the device, receiving from the server a signal inviting the device to connect to a network. Said signal encodes both: the device identifier as identified by the server based at least in part on information transmitted to the server; and a network identifier of said network. The network identifier is encrypted with the public key as identified by the server based at least in part on information transmitted to the server. The device decrypts the network identifier, using the private key as stored thereon and, based at least in part on the decrypted network identifier, it initiates a network connection with the network.

The above scheme allows even minimalist devices to be easily but securely connected to a legitimate network, without requiring the user to configure the devices and, even, without involving any user interface at the device. Using such an interface would make it more complicated to connect the device, as this requires multiple operations for the user. Rather, in the present approach, the user simply needs to detect (read, scan or receive) information provided with or by the device and pass it to the server, for the latter to transmit an invitation to the device, which can then initiate the network connection.

The above scheme does not require any pre-shared key, a PIN to be entered by the user. It does not require that access control is temporarily disabled, as such mechanisms typically make the network vulnerable or involve manual, error-prone operations.

The method exposed above recites basic operations as implemented at the device. In embodiments, the method may comprise additional operations as executed at (or with) other components that the device interacts with. For example, this method may further comprise, prior to receiving the invitation signal at the device: detecting said information from the device with said detector; and providing the detected information to the server, for it to identify the device identifier and the public key.

At the server, the present methods may typically comprise: receiving information related to the information as detected by the detector; and identifying the device identifier and the public key based at least in part on the received information.

In embodiments, identifying the device identifier and the public key at the server comprises entering the device identifier and the public key in an access database of the network. In some embodiments, no further verification is performed by the server at this point as the information provided with the device (as detected by the detector and then transmitted to the server) may already suffice to prove the authenticity of the device.

In embodiments, the present methods further comprise, at the server, and after having identified the device identifier and the public key: instructing one or more network access points of the network to transmit the invitation signal. The present methods may for instance further comprise transmitting the invitation signal from at least one of the one or more network access points. The signal transmitted is in some embodiments beaconed by one or more of the network access points.

In embodiments, the information provided with the device is encoded as a machine-readable optical label; and detecting said information comprises optically reading the machine-readable optical label with said detector.

In some embodiments, the machine-readable optical label is exposed on one of: a surface of the device; a packaging of the device; and a documentation of the device.

In embodiments, the network identifier encoded in the signal received by the device comprises one or more of: a basic service set identifier, or BSSID; a service set identifier, or SSID; a media access control address, or MAC address; an IP address of the network; and a public key of the network.

In some embodiments, initiating the network connection comprises an authentication operation based at least in part on a Wi-Fi Protected Access protocol, or WPA. Said wireless application protocol may for instance be a WPA2 protocol. It may for example be one of: an extensible authentication protocol, or EAP; and EAP transport layer security, or EAP-TLS.

In embodiments, the present methods further comprise, prior to providing the device: assigning the device with said device identifier and said asymmetric cryptographic key pair; and storing the private key on the memory of the device.

In some embodiments, such methods further comprise, after assigning the device with said device identifier and said asymmetric cryptographic key pair: wrapping said device identifier and said public key in a certificate signed by a certification authority.

According to another aspect, the invention is embodied as a method for connecting a device to a network, this time implemented on the server side. The context of the device is the same as discussed above: the device is assigned with a device identifier and an asymmetric cryptographic key pair (whose private key is stored on a memory thereof), and is provided with information as to the assigned device identifier and/or the public key. Again, this information is detectable by a detector so as to be transmissible to a server. This method first comprises, at the server: upon receiving information related to information as detected by the detector, identifying the device identifier and the public key assigned to the device based at least in part on the information received. In addition, the method comprises instructing to transmit to the device a signal inviting the device to connect to a network. The signal will encode both the device identifier as identified by the server and a network identifier of the network, wherein the network identifier is encrypted with the public key as identified by the server, for the device to decrypt the network identifier using the private key and initiate a network connection with the network.

According to another aspect, the invention is embodied as a set comprising a device connectable to a network and a medium encoding information. Again, the device comprises a memory storing a private key of an asymmetric cryptographic key pair assigned to the device. The medium encodes information pertaining to a device identifier assigned to the device and/or a public key corresponding to said asymmetric cryptographic key pair. The information is again encoded so to be detectable by a detector and be transmissible to a server for it to identify the device identifier and the public key assigned to the device. The device is configured to detect a signal inviting the device to connect to a network, which signal encodes both: a device identifier as identified by the server based at least in part on information transmitted thereto; and a network identifier of the network, the latter encrypted with the public key as identified by the server based at least in part on information detected by the detector. Furthermore, the device is configured to: decrypt a network identifier as encoded in such a signal, using the private key, upon detecting this signal; and initiate a network connection with said network, based at least in part on such a decrypted network identifier, upon decrypting the latter.

In embodiments, said information is encoded as a machine-readable optical label of the device, which can easily be detected by a detector. The machine-readable optical label is for example a matrix code.

In embodiments, the device is deprived of any user interface for connecting said device to the network, which makes the present connection methods all the more attractive that they do not require the user to configure the device.

In some embodiments, the device comprises one or more wireless connectivity modules. These modules are generally configured for detecting the invitation signal and initiating said network connection with the network.

According to another aspect, the invention is embodied as a server configured to interact with a device assigned with a device identifier and an asymmetric cryptographic key pair that includes a public key and a private key, wherein the device stores the private key on a memory thereof and is provided with information as to the assigned device identifier and/or the public key, said information detectable by a detector so as to be transmissible to a server. The server is configured to: identify the device identifier and the public key assigned to the device based at least in part on the information received, upon receiving information from the detector; and instruct one or more network access points of a network to transmit a signal inviting the device to connect to a network, this signal encoding both the device identifier as identified by the server and a network identifier of said network, the network identifier encrypted with the public key as identified by the server, for the device to decrypt the network identifier using the private key and initiate a network connection with said network.

The invention can further be embodied as a network comprising the above server, as well as the one or more network access points. The network is configured to complete a network connection as initiated by the device to subsequently communicate therewith.

According to a final aspect, the invention is embodied as a computer program product for allowing a server to interact with a device assigned with a device identifier and an asymmetric cryptographic key pair, the latter comprising a public key and a private key, wherein the device stores the private key on a memory thereof and is provided with information as to the assigned device identifier and/or the public key, said information detectable by a detector so as to be transmissible to a server, the computer program product comprising a computer readable storage medium having program instructions embodied therewith. The program instructions are executable by one or more processors of the server to cause the server to: identify the device identifier and the public key assigned to the device based at least in part on the information received, upon receiving information from the detector; and instruct one or more network access points of a network in communication with the server to transmit a signal inviting the device to connect to the network, this signal encoding both the device identifier as identified by the server and a network identifier of said network, the network identifier encrypted with the public key as identified by the server, for the device to decrypt the network identifier using the private key and initiate a network connection with said network.

Devices, servers, networks, computerized methods and computer program products embodying the present invention will now be described, by way of non-limiting examples, and in reference to the accompanying drawings.

BRIEF DESCRIPTION OF THE DRAWINGS

The accompanying drawings show simplified representations of devices or parts thereof, as involved in embodiments. Similar or functionally similar elements in the figures have been allocated the same numeral references, unless otherwise indicated.

DETAILED DESCRIPTION

Figure 1:
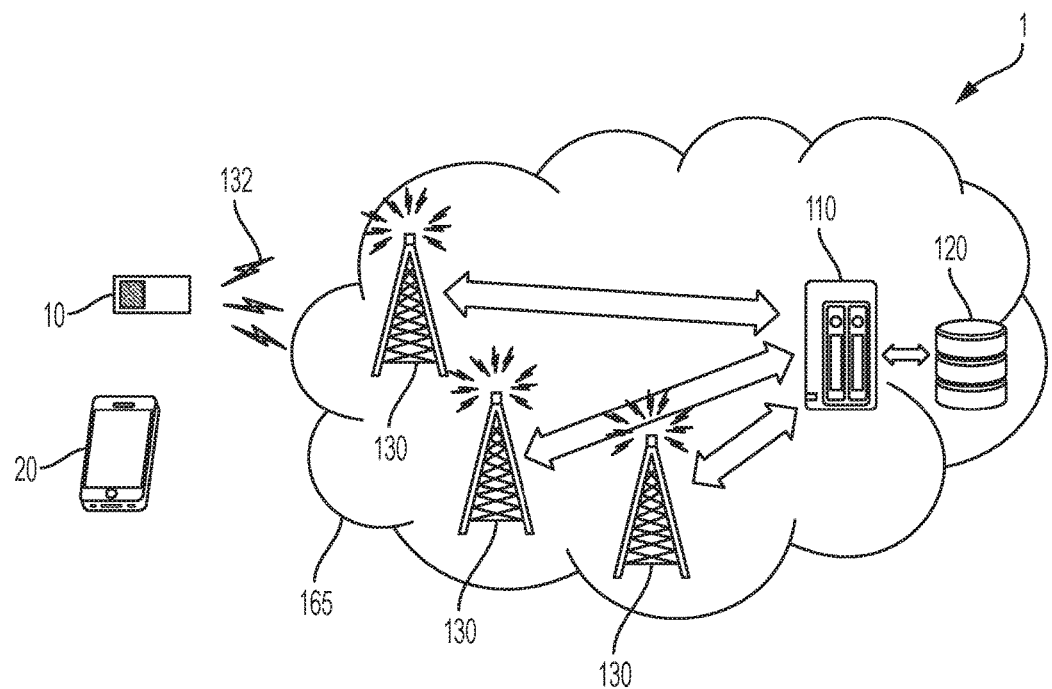
FIG. 1 is a diagram schematically illustrating selected components (IoT device, detector, server and network elements) of a system, as in embodiments.

The following description is structured as follows. First, general embodiments and high-level variants are described (sect. 1). The next sections (sect. 2 and 3) address more specific embodiments and technical implementation details.

1. General Embodiments and High-level Variants

In reference to FIGS. 1-3 and 5, an aspect of the invention is first described, which concerns methods for connecting a device 10 to a network 165. Such methods may involve operations or action taken at several components 10, 20, 110, 120, 130 of a system 1. Yet, particular aspects of the present invention only concern operations as performed at the device 10 or at the server 110. Other aspects concern the device itself (provided with specific information so as to form a set), the server, a network involving the latter, and a computer program product, as evoked in the previous section.

In the following, an overview of the present methods is given, which involve several components of the system 1. First, a device 10 is provided (operation S30, FIG. 3), which device is assigned (operation S10) with a device identifier (or device ID) and an asymmetric cryptographic key pair 12, 12*a*. This pair includes a public key 12 and a private key 12*a*.

The private key 12*a* is stored S20 on a memory 18, 182 of the device 10. The device 10 is otherwise provided S25 with information 11 pertaining to the assigned device ID and/or the public key 12.

This information 11 may be encoded and stored, displayed or otherwise printed in such a manner that it is detectable by a detector 20, e.g., a smartphone, a tablet or a dedicated detector that is made available to the user 30. Thus, this detector may be used to detect S40 the information 11 provided with the device and, optionally, to transmit S50 the detected information to a server 110. This information may else be communicated to the server by the user, using another channel. In all cases, the information received at the server allows, in turn, the server to identify the device ID and the public key 12 assigned to the device 10.

Once the server 110 has identified the device and its associated public key, it sends S60 (or instructs to send) a signal 132 inviting the device 10 to connect to a network 165. The device 10 receives S70 such a signal 132 at operation S70.

The signal 132 encodes both the device ID (as identified by the server 110 based at least in part on information transmitted to the server) and a network identifier (or network ID) of the network 165 to connect to. Interestingly, the network ID is encrypted in the signal with the public key 12 as identified by the server 110.

In response, the device proceeds to decrypt S75 the network ID, making use of the private key 12*a* as stored thereon. Once the device has decrypted the network ID, it will initiate S80 a network connection with this network 165, based at least in part on the decrypted network ID.

The above scheme allows devices 10 to be easily but securely connected to a legitimate network 165, without necessarily requiring any user interface at the device. Using such an interface would anyway make it more complicated to connect the device, as it requires multiple operations for the user. Rather, in the present approach, the user simply needs to detect (read, scan or receive) information provided with or by the device and pass it to the server, for the latter to transmit an invitation to the device, which can then initiate the network connection. Aside from its simplicity, the above scheme does not require any pre-shared key or a PIN to be entered by the user and does not more require temporary disabling access control, as such mechanisms would typically make the network vulnerable or involves manual, error-prone operations.

Comments are in order. Operations S30, S70 and S80 involve the device 10 directly and form the basis of a particular aspect of the invention. The other operations mentioned above may only implicitly or indirectly involve the device 10; they may form part of other aspects of the invention, as discussed later in detail.

The device 10 may typically be an IoT device. As evoked above, this device is in some embodiments deprived of any user interface (UI) that would otherwise allow to configure it to initiate a connection to the network 165. I.e., the device 10 can be made as simple as possible. Still, even for devices having a UI, the present approach makes it much more efficient to configure network access for such devices, compared to a manual configuration via the UI of the device or a connected computerized system.

The device ID is typically devised so as to be unique. I.e., each device belonging to a set of similar devices (likely to be connected in the same manner) may have a unique ID, i.e., an ID devised so as to unambiguously identify the device 10 at the server 110. Yet, even if this ID is non-unique or ambiguous, in which case multiple devices may potentially respond to the invitation 132 sent S60, S70, only one of these devices is provided with the correct private key and will therefore be able to decrypt the identifier of the network to connect to.

Figure 2:
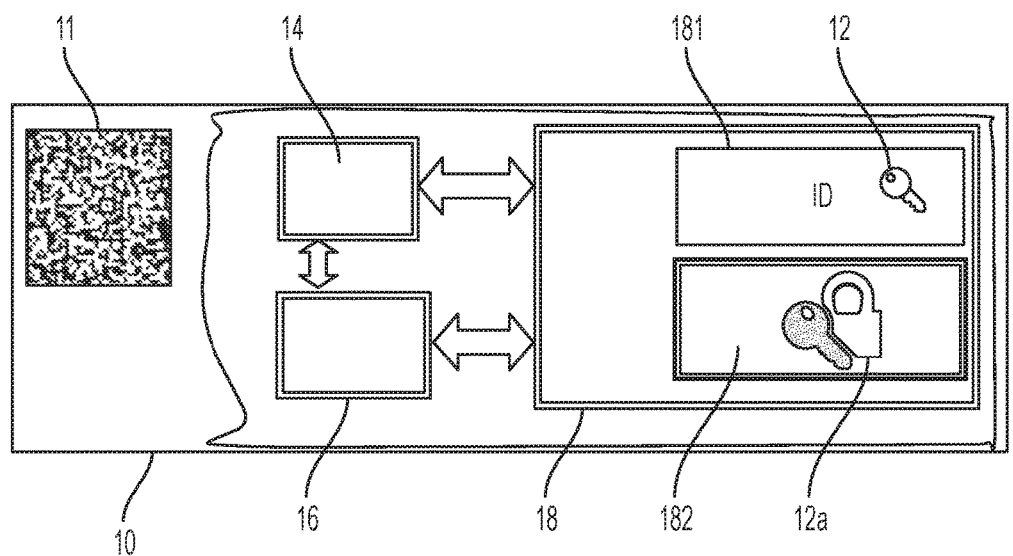
FIG. 2 schematically depicts an IoT device and shows components thereof, as involved in embodiments.
Figure 3:
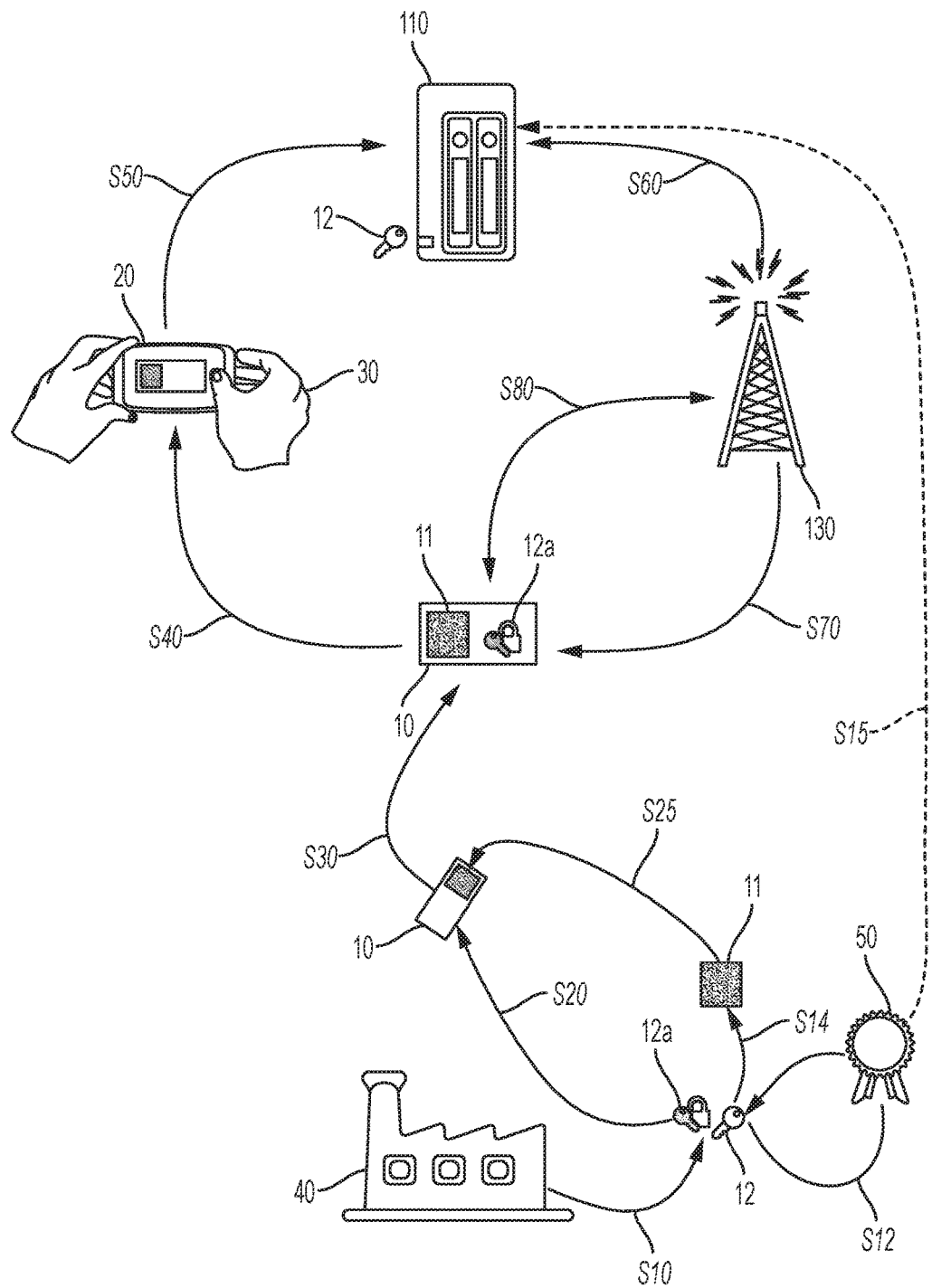
FIG. 3 is a flowchart illustrating high-level operations of a method for connecting a device, according to embodiments.
Figure 4:
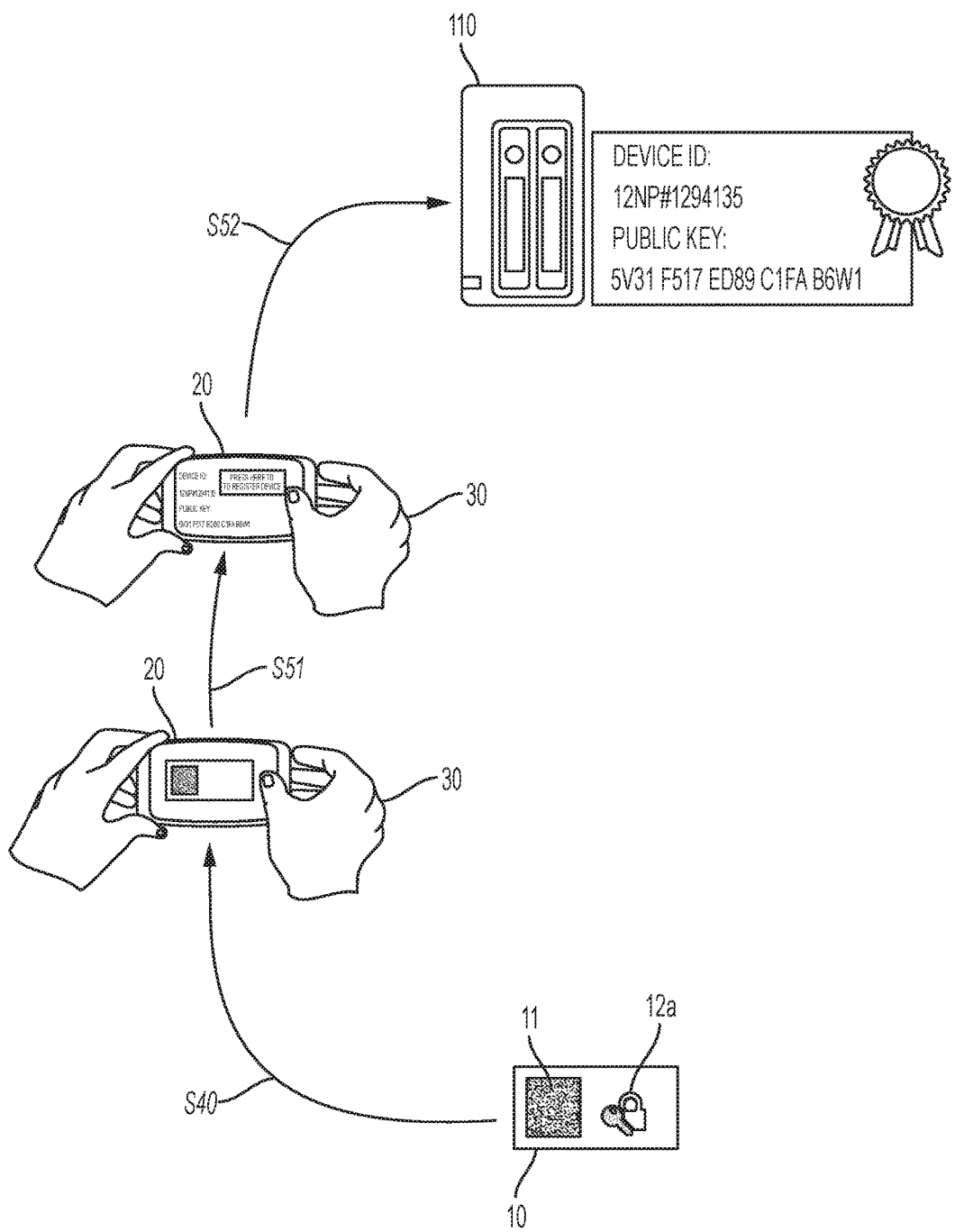
FIG. 4 is a flowchart illustrating a variant to FIG. 3.

As illustrated in FIGS. 2-4, the information 11 as initially provided S25 with the device 10 is in some embodiments encoded as a machine-readable label 11, which is designed so as to be detectable S40 by the detector 20, in order to identify information encoded therein. The machine-readable label may for instance be an optical label, which is easily detected S40, optically, e.g., using a smartphone as a detector, with a suitable application running thereon. It may for instance be a one- or two-dimensional barcode that encodes information 11 as to the assigned device ID and/or the public key 12. In that case the label is visible on the device 10, a packaging or a documentation thereof.

For example, the optical label may be provided as a two-dimensional barcode on a sticker stuck on an external surface of the device 10 (as in FIG. 2). In variants, this optical label 11 may be provided on a packaging of the device or on a related documentation. Providing this information directly on the device mitigates the risk of non-intended or malicious use. Else, a non-legitimate user may for instance be able to scan the label exposed on the packaging or on the documentation and illegitimately solicit network access for the device (e.g., without actually purchasing it).

In variants to optical labels, this information may be stored on a memory of the device and be wirelessly transmitted by the device 10 to the detector 20, e.g., a smartphone. The detector may use a Wi-Fi or a Bluetooth connection to that aim. Wi-Fi and Bluetooth would be typical network technologies that the device 10 may otherwise use for other purposes, e.g., to perform their basic functions. Yet, the device ID and/or the public key would in some embodiments be transmitted out-of-band using another technology, e.g., by near-field communication (NFC) or radio-frequency identification (RFID).

The information 11 initially provided S25 with the device may comprise either the device ID (without the public key), or the public key 12 (without the device ID), or both the device ID and the public key 12. In some embodiments, both types of information are encoded in said information 11 and made available to the detector for it to transmit S50 to the server (in that case the public key may be used to ascertain the authenticity of the device). Incidentally, the key can further be certified S12, during an earlier operation, so as to make it possible to verify integrity of the device. However, instead of requiring the device ID and public key to be sent to the server 110 upon detection, only the device ID could be encoded S14, detected S40 and sent S50. In that case, the server 110 could nevertheless use the device ID to request the public key from another source, e.g., the manufacturer 40. This variant implicitly verifies the integrity of the device 10, as an alternative to the use of a certified key.

In all cases, the detector 20 may directly transmit S50 the detected S40 information to the server 110, as illustrated in FIG. 3, e.g., thanks to an application running on the smartphone and logged in the server. The transmission may be automatically triggered upon detection. If necessary, user validation may be requested, as illustrated in FIG. 4, prior to sending. In less efficient variants, the user may have access the server, using a distinct device, e.g., a computer (which may requires the creation of an account) and enter the device ID and public key, as first detected by the detector 20.

In some embodiments, the detector 20 is a handheld device, e.g., smartphone. In variants, dedicated detectors may be used, in place of smartphones. For example, such detectors may be handheld, secure device protected by design against malicious software (or malware) and having minimalist processing means, memory and interfaces, as discussed later in detail. Such devices are appropriate when systematically scanning numerous IoT devices to connect them, e.g., for industrial-scale deployments. In such a context, the detected information 11 is in some embodiments directly transmitted from the detector (e.g., via a computerized device connected to the server or an access point of the network) to the server 110.

Eventually, the information 11 received at the server is typically provided S55 to and entered in an access database 120 of the network's server, FIG. 1. The information provided S50 may first be entered into the access database and then be identified as such by the server, prior to instruct to send the invitation 132. In variants, the detected information may first be sent to the server 110 and then logged in the database 120. As said earlier, the information received at the server may need be complemented, e.g., by separately fetching a public key corresponding to a received device ID. In all cases, the server needs, at some point, to identify both a device ID and a corresponding public key, prior to (instruct to) send the invitation signal 132.

The identification operation performed by the server may merely amount to verify or acknowledge that the device ID and the public key were appropriately entered into the access database 120, without further verification being needed. Since entering the ID and public key into the access database is a direct consequence of the detection operation S40, no additional verification is required. Indeed, the detector or the user must be logged into the server to be able to transmit information as to the device and the log-in has already proved that the detector/user is authorized to add devices to the access database. Thus, any ID—public key combination sent to the access server 110 may directly be entered into the access database without further verification.

Yet, in variants, the server may perform a comparison of information it receives at operation S40 with information previously made available to it, for example at operation S15 (optional, FIG. 3).

The invitation subsequently sent S60, S70 from the server 110 is encoded as a signal, based at least in part on information 11 communicated to the server. In typical embodiments, this invitation is indirectly received S70, e.g., via a network access point 130 of the network 165. A network access point is to be understood in a broad sense. It refers to any device or apparatus such as a wireless router or a wireless access point (WAP), or a base station, which allows the network to wirelessly communicate with mobile devices.

In variants, the invitation is received via the same detector 20 (e.g., mobile device, smartphone, dedicated device, etc.) as initially used to acquire S40 the information 11. Thus, the detector may also be regarded as a network access point for the IoT device, at least if configured to act as such. For example, a smartphone as used to initially read, e.g., a 2D matrix code, can further be used as a network access point, in which case the smartphone is additionally configured as a hub (as typically done for wearables in the context of a body-area network).

Incidentally, the server and the access database may, in specific embodiments, also reside on the same device (smartphone) as used to detect S40 the information 11.

However, in more typical implementations, the server 110, the detector 20 and the database 120 are distinct computerized entities. Many intermediate configurations are possible, as the person skilled in the art will appreciate.

The invitation is a signal that is typically beaconed S70, through one or more the network access points 130 of the network 165. The invitation sent at operations S60, S72 can be regarded as comprising an encrypted token, which comprises a suitable network ID. In some embodiments, this network ID comprises particulars of the network 165, or of an access point thereof, which makes it harder for a listening entity to fake the signal emitted by the legitimate network 165. It may for instance be an SSID or an IP address of the network 165, or a public key of the network or of an access point thereof.

Remarkably, the network ID is encrypted in the signal sent with the public key of the device, so that only the device 10 can decrypt it, using its private key 12*a*. As a result, the device 10 can unambiguously discover to which network it must connect. The network ID can be encrypted by the server 110, the network access point(s), typically by an encrypting unit in communication therewith. In all cases, the network ID is encrypted before being encoded as a signal 132 transmitted to the device 10.

Once decrypted, the network ID encrypted in the invitation signal 132 allows the device 10 to unambiguously know to which network (or which access point thereof) it must connect. More generally, the encrypted token could also include information about the device shared via an out-of-band detection process, e.g., the public key or other data pertaining to the device 10. Using only device-specific information would, however, be vulnerable to a replay attack. Therefore, the present scheme uses network-specific information in the encrypted token.

Yet, this network-specific information can be complemented with additional information. For example, the server may provide both a network ID (i.e., a particular of the network, encrypted) and a particular of the device 10 (other than the device ID, e.g., the public key), so as for the latter to verify that the invitation 132 was indeed addressed to it. Thus, the device 10 may also need to store such particulars, e.g., the public key assigned to it, for verification purposes. More generally, the server might send additional information besides the network ID if such additional information is required by the device to connect to the network.

The device ID as encoded in the signal 132 is in some embodiments not encrypted (contrary to the network ID), so that the device does not have to decrypt each and every signal it receives. It will only do so upon receiving a beacon signal that includes its ID in the clear.

Finally, the network connection request initiated S80 by the device 10 typically includes an authentication operation, which may for instance uses a standard WAP2 authentication protocol such as EAP-TLS, or any other suited protocol.

The network connection request may be initiated by the device 10 with the same access point 130 from which the signal was received, or not. Indeed, embodiments can be contemplated where the invitation asks the device to connect to a specific network access point or, even, to a different network. However, in typical implementations, the invitation is sent by the same network to which the device subsequently connects to.

The server 110 can be regarded as an authorization and authentication server of the network. In the authorization operation S55, the server identifies the device (e.g., by checking that the ID of the device is indeed present in the access table). In the authentication operations S60-S80 the server 110 uses the public key associated to the device ID to send the device 10 a challenge, wherein data (the network ID) is encrypted with the public key, the challenge requesting the device to decrypt it with its private key to prove its identity. The server grants network access only if the device ID is present in the access table and the device is able to solve the challenge.

The server 110 may in fact involve several servers or components, e.g., an access database 120, an authorization server, an authentication server, etc. In other implementations, the server or components thereof may also be integrated with the detector 20, as mentioned earlier.

At present, more specific operations of the present methods are described, in relation to specific components of the system 1 that implement them.

To start with, the present methods may further comprise operations as implemented by or thanks to the detector 20. For instance, in embodiments, the present methods comprise detecting S40 information 11 as provided with the device 10, using the detector 20. Next, the detected information is provided S50 to the server 110, e.g., directly by the detector 20, for the server to identify the device ID and the associated public key 12.

Note that present methods may be used to connect a plurality of devices, e.g., using the same detector 20 to detect information 11 provided with each of the devices 10 and provide information 11 detected for each of the devices to one or more servers 110, for them to identify the corresponding device IDs and public keys, and so on.

The information detected at operation S40 is in some embodiments directly transmitted by the detector, as mentioned earlier. This information 11 may for instance be wirelessly communicated S50 to the server (e.g., upon instruction by a dedicated application running on the detector 20). In variants, the information is manually entered by the user, using an interface of the detector or any other computerized entity, in communication with the server, as evoked earlier.

Next, present methods may further comprise operations as implemented by the server 110. For instance, in embodiments, such methods further comprise, at the server 110, a operation of receiving S50 information as detected by the detector 20. In variants, the information received may be information derived from the detected information (the information that the detector detects and the information transmitted to the server need not be strictly identical, provided that essential data are transmitted to the server).

Figure 5:
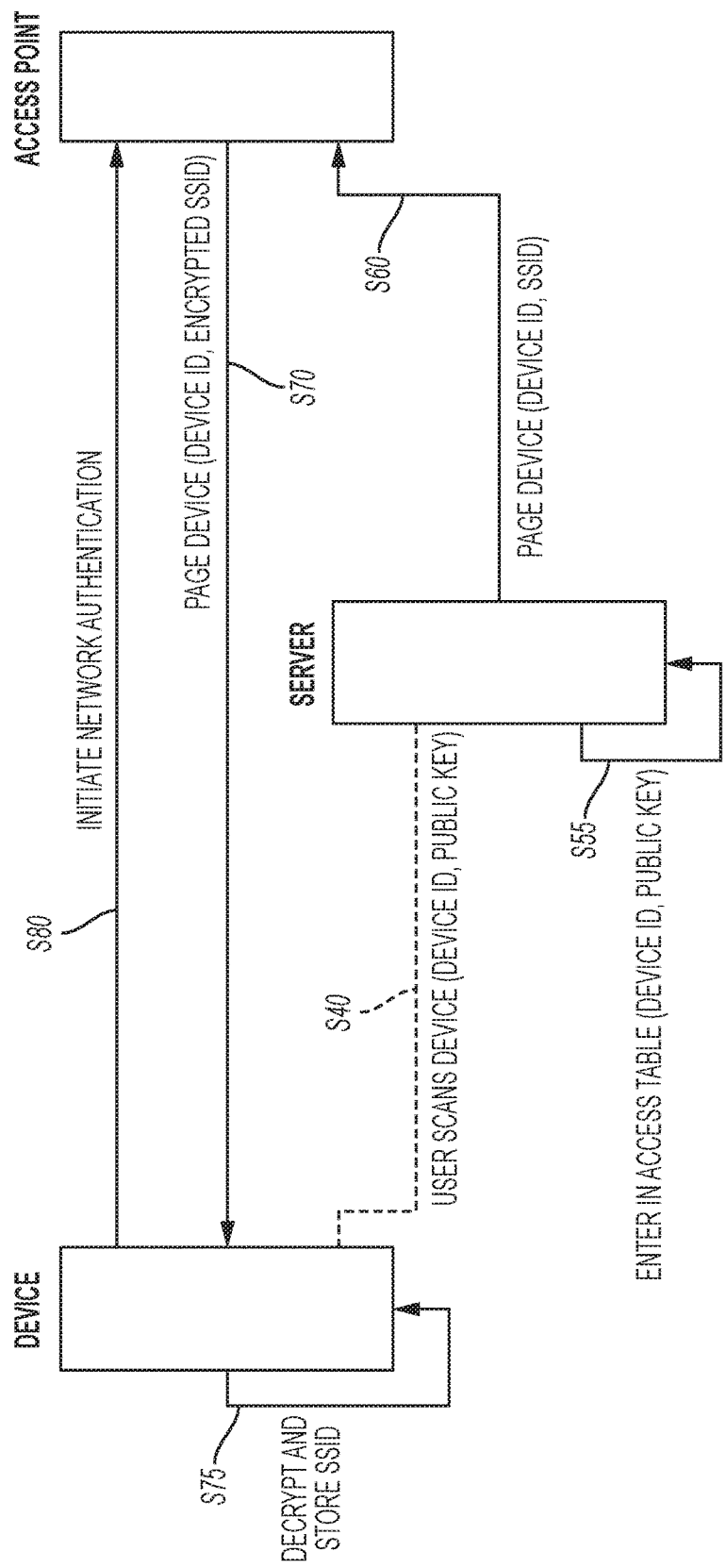
FIG. 5 is a flowchart illustrating high-level operations of a method for connecting a device, as implemented at the device, the server, and an access point of the network, according to embodiments.

Next, the server may proceed to identify S55 the device ID and the public key 12 based at least in part on the received S50 information, as indicated earlier. As illustrated in FIG. 5, operation S55 may, in embodiments, comprise entering S55 the device ID and the public key 12 in an access database 120 of the network 165.

As illustrated in FIGS. 3, 5: after it has identified S55 the device ID and the public key 12, the server 110 may instruct S60 one or more network access points 130 of the network 165 to transmit S70 the invitation signal 132. E.g., the server 110 may send beacon message to the access points 130 for broadcasting, in order to page the device 10.

Accordingly, the present methods may further comprise operations as implemented by such access points 130. Namely, in embodiments, the present methods further comprises transmitting S70 the invitation signal 132 from at least one of the one or more network access points 130. The signal 132 transmitted is typically beaconed S70 by the network access points 130. I.e., beacon frames are transmitted periodically to announce a wireless LAN to the device 10, by one or more access points 130 of the infrastructure basic service set (IBSS). The beacon generation may for instance be distributed among the stations.

The network ID encoded in the signal 132 in some embodiments includes a basic service set identifier (BSSID), a service set identifier (SSID), a media access control address (MAC address), an IP address of the network 165, and/or a public key of the network 165 (or an access point thereof). In practice, it is perhaps best to use an SSID as it is valid for any access point belonging to that network whereas an access-point ID is specific to only one particular access point.

Other types of network ID can be contemplated, based at least in part on information derived from, e.g., a basic service set (BSS), or an extended service set (ESS). Typically, a BSS is identified by its BSSID and an ESS is identified by its SSID. It is, however, preferable to use information that the device may later need during the connection set-up. This way, a successful connection that uses that information implicitly verifies its correctness rather than requiring a separate verification operation. Now, beyond network technologies as specified by IEEE 802.11, i.e., Wi-Fi, other technologies may also be contemplated and, thus, other types of network ID may be used.

In embodiments, the network connection (as initiated at operation S80) comprises an authentication operation based at least in part on a Wi-Fi Protected Access protocol, or WPA. This wireless application protocol may for instance be the so-called WPA2 protocol. In particular, this protocol may be based at least in part on the extensible authentication protocol (EAP), or, better, on the EAP transport layer security (EAP-TLS). Other IoT protocol suites are known, such as Bluetooth LE, which can be contemplated as well. More generally, the present connection methods may be based at least in part on other cryptographic exchanges, e.g., using cryptographic information as encoded alongside the network ID.

Referring to FIG. 2, 3, initial operations S10-S30 are now described in detail, which operations form part of embodiments of the present methods. For instance, and prior to distribute S30 the device 10, the device 10 need be assigned S10 a device ID and an asymmetric cryptographic key pair 12, 12a, the latter including said public key 12 and said private key 12a. In all cases, the private key 12a need be stored S20 on a memory 18, 182 of the device 10.

If needed (e.g., for verification purposes), the device ID and the corresponding public key 12 may be communicated S15 to the server 110. In some embodiments though, no prior data transmission by the manufacturer 40 is required, as noted earlier.

Referring more particularly to FIG. 3, in embodiments, after operation S10, the assigned device ID and public key 12 may be wrapped S12 in a certificate signed by a certification authority 50. Once signed, the public key may be stored on the device, along with the private key 12a, at operation S20. Thereby, the CA confirms that the key is authentic, i.e., it has been issued by a legitimate manufacturer 40. By extension, this confirms that the device is genuine. The certificate can later be checked by the server, e.g., before entering it into the access database at operation S55 (FIG. 5).

The information 11 needed for detection is concurrently made available with the device at operation S25. This information may encode include the public key, in which case the public key can be obtained from the detector 20 upon detection. In variants, the server 110 may obtain the public key directly from the certification authority 50, operation S15, e.g., upon enquiry by the server 110, in which case only a device ID need be encoded. Note, however, that the public key is a form of device ID and could therefore be used as a device ID. More sophisticated variants can be contemplated, requiring both types of information (device ID and public key) to be stored both on the device 10 and, if necessary, separately communicated S15 to the server 110.

According to another aspect, the invention can be embodied as a set comprising a device 10 connectable to network 165 and a medium 11 encoding information. This set is now described in reference to FIG. 2.

The device 10 basically comprises a memory 18, 182 storing at least the private key 12a of the asymmetric cryptographic key pair 12, 12a assigned to the device 10.

The device 10 is generally configured to detect an invitation signal 132 as sent at operation S70 and to decrypt a network ID as encoded (encrypted) therein, using the private key 12a as stored on its memory, upon detecting this signal 132. Moreover, the device is configured to initiate S80 a network connection with the network 165, based at least in part on the decrypted network ID, upon decrypting the latter.

The medium 11 encodes information 11 pertaining to the device ID assigned to the device and/or the public key 12 corresponding to said asymmetric cryptographic key pair 12, 12a. Said information 11 is encoded so to be detectable by a detector 20 and be, in turn, transmissible to the server 110 for it to identify the device ID and the public key 12 assigned to the device 10.

The medium 11 may for example be a sticker, e.g., stuck on the device 10 itself (on an external surface of the device, as assumed in FIG. 2), or on a packaging of the device, or a page of an accompanying documentation, as mentioned earlier. It may else be printed on this page or on the packaging.

In other variants, the medium 11 is a memory of the device, which stores the necessary information. In that case, the device 10 need further be configured to transmit this information as a signal, for it to be detectable by the detector 20.

Thus, the above set may physically correspond to the device 10, with the medium forming part of the device (e.g., as a memory or a sticker stuck on the device). Else, this set may comprises two distinct entities, which are, on the one hand, the device 10 and, on the other hand, a distinct medium (sticker stuck on a packaging of the device, this packaging, or a related documentation, etc.). Most efficient, however, is to encode information 11 as a machine-readable optical label, e.g., exposed on an external surface of the device, so as for it to be easily accessible with an optical detector 20.

The private key 12a may possibly be in some embodiments stored on a secured memory 182 of the device, to mitigate the risk of malicious use. The memory 18 may indeed comprise several memory module 181, 182, including a secure memory. Yet, minimalist devices can be used, which do not require any interaction with the user and the private key may therefore be stored on a non-secure memory 181 of the device.

In embodiments as evoked earlier, the device may also need to store its own ID and/or the public key, which it may use to recognize when it is invited by the server. The device ID and/or the public key may for instance be stored on a non-secure memory module 181 of the device.

Each of the device 10 and the detector may be designed as a secure device, which is protected by design against malicious software or malware. Both will typically have processing means 14, connectivity modules 16, a memory 18 and interfaces, etc., allowing the device to couple to or interact with: a user; a host, such as another device, a personal computer or PC, and a server. For example, each device 10, 20 may be deprived from some client interfaces for software installation or other functions that would expose it to a malware.

The devices 10, 20 may possibly be provided with simple user input and output capabilities. However, in embodiments, the device 10 is deprived of any user interface that would allow the user to connect the device 10 to the network 165. I.e., there is no button, no display allowing the user to manually connect the device. In particular, no PIN need be inputted by the user (as this is anyway not required by the present methods).

The device 10 will typically comprise one or more wireless connectivity modules 16, to detect on the one hand, the invitation signal 132, and, on the other hand, to initiate a network connection with the network 165. For the device 10 to be able to listen to beacon signals 132, the device may be equipped with a Wi-Fi, Bluetooth or ZigBee module, for instance, which modules wirelessly enable the device. In some embodiments, only one module is necessary for the device to both receive beacon signals, attach to and then communicate with the network.

According to another aspect, the invention can be embodied as a server 110. As illustrated in FIGS. 1-3, this server 110 is configured to interact with the device 10 and, as necessary, with other components 120, 130 of the network 165. Most basically, the server 110 is configured to identify S55 the device ID and the public key 12 assigned to the device 10, upon receiving information from the detector 20 and based at least in part on information it receives S50. In addition, the server is adapted to instruct S60 one or more network access points 130 of the network 165 to transmit the invitation signal 132.

The present invention may furthermore be embodied as a network 165 or a system 1 comprising this server 110, as well as one or more network access points 130. The network 165 is generally configured to complete a network connection as initiated by the device 10, so as to subsequently communicate therewith.

Additional aspects of the server 110 and the network 165 are described in section 2.

According to a final aspect, the invention can be embodied as a computer program product, which comprises a computer readable storage medium having program instructions embodied therewith, wherein the program instructions are executable by one or more processors of the server 110 to cause the latter to implement operations S50-S60. Additional aspects of this computer program product are described in section 3.

The above embodiments have been succinctly described in reference to the accompanying drawings and may accommodate a number of variants. Several combinations of and variants to the above features may be contemplated. For example, in particularly embodiments, the present methods are implemented for connecting one or more devices 10, such as IoT devices, to one or more networks 165. Such methods comprise (for each device to be connected):

On the manufacturer side,
  assigning the device 10 a unique ID and an asymmetric cryptographic key pair 12, 12*a*, the device 10 storing at least the private key 12*a* corresponding to that key pair 12, 12*a*; and
  supplying the device 10, and concurrently supplying the assigned ID and a public key 12 corresponding to that key pair 12, 12*a*, as a machine-readable optical label, e.g., as a matrix code 11 stuck to the device, On the user side:
  Receiving the supplied device 10, and said machine-readable label 11;
  Scanning, with a scanning device 20, the received ID and public key 12 encoded within said label 11; and
  Communicating the scanned ID and public key 12 to an access database 120 of a server 110;

On the server/network side:
  Identifying a new entry corresponding to the entered device ID and public key 12;
  Sending this new entry to at least one network access point 130 for it to broadcast a request 132 to the device 10, for the latter to connect to the network 165, the request including the network ID (e.g., a SSID), encrypted therein; and
  Receiving a network connection request initiated by the device 10 in response to the request sent.

Other examples are given in the next sections.

2. Use Case

The manufacturer fits the IoT device with a unique device ID and an asymmetric key pair, and sticks the ID and the public key to the device in a machine-readable way, e.g., as a matrix code. The person deploying the device scans the code to enter the ID and public key into the access database of the IoT network's authentication server. The new entry is sent to at least one network access point which broadcasts a request for the device with the given ID to connect, the request including the network ID. The network can prove the legitimacy of its request using the devices public key. The device can then initiate a network connection using a standard authentication protocol such as EAP-TLS. As a result, the deployer only needs to scan the device's code to connect it to the network, in a single operation.

In more detail, the manufacturer of the IoT device configures the device with a globally unique ID (such as a MAC address) and a cryptographic key pair. Optionally, the public key of the key pair can be wrapped in a certificate, along with the device ID, which certificate is signed by a certification authority. The manufacturer provides this information in a machine-readable form, e.g. by sticking a sticker with a matrix code onto the device (or a packaging thereof).

An example of protocol for configuring secure network access is given in FIG. 5. An administrator (or operator) scans S40 the IoT device's ID and public key and communicate S50 them to the network's authentication and authorization server, thus granting the device permission to access the network. The server instructs S60 the network, i.e., at least one access point thereof, to page the device by broadcasting S70 a beacon with the device ID. The access point also includes a security token (which encode the network ID) in the beacon message that it encrypts using the IoT device's public key. The IoT device, upon receiving S70 a beacon message with its ID, will decrypt S75 the security token using its private key. It verifies the security token and then initiates S80 a standard WPA2 access procedure, e.g., EAP-TLS, in order to connect to the network.

3. Technical Implementation Details 3.1 Computerized Devices

Computerized devices (in particular devices 10, 20, 110, 120, 130 as depicted in FIGS. 1-3) can be suitably designed for implementing embodiments of the present invention as described herein. In that respect, it can be appreciated that the methods described herein are largely non-interactive and automated. In exemplary embodiments, the methods described herein can be implemented either in an interactive, partly-interactive or non-interactive system. The methods described herein can be implemented in software (e.g., firmware), hardware, or a combination thereof. In exemplary embodiments, the methods described herein are implemented in software, as an executable program, the latter executed by suitable digital processing devices. More generally, embodiments of the present invention can be implemented wherein general-purpose digital computers, such as personal computers, workstations, etc., are used.

Figure 6:
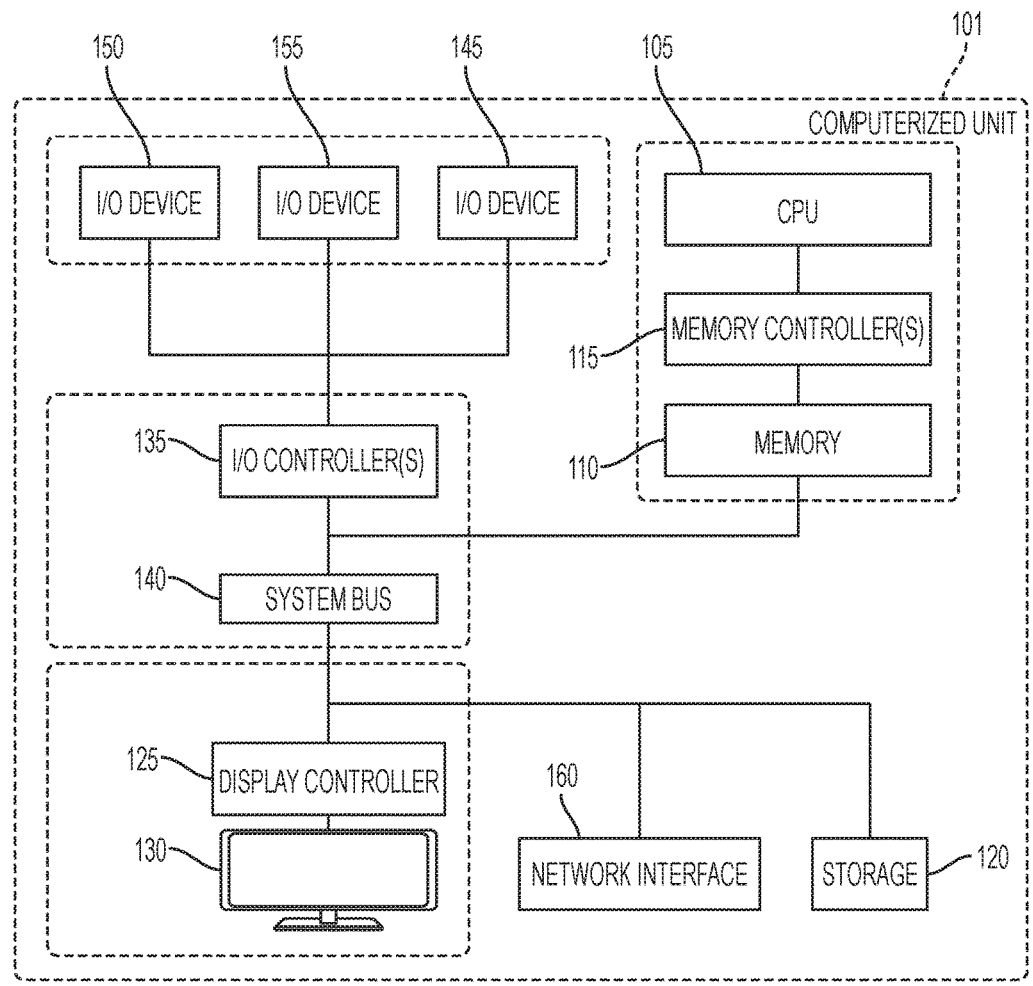
FIG. 6 schematically represents a general purpose computerized system, which can for instance be used as an authorization and authentication server for implementing one or more method operations according to embodiments.

For instance, FIG. 6 schematically represents a computerized unit 101, which may be used as a device 10, a detector 20, a server 110, a router, or in an access point 130 of the network 165. In exemplary embodiments, in terms of hardware architecture, as shown in FIG. 6, the unit 101 includes a processor 105, memory 110 coupled to a memory controller 115, and one or more input and/or output (I/O) devices 145, 150, 155 (or peripherals) that are communicatively coupled via a local input/output controller 135. The input/output controller 135 can be connected to a system bus 140, and/or include one or more buses or other wired or wireless connections, as known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), or generally any device for executing software instructions.

The memory 110 can include any one or combination of volatile memory elements (e.g., random access memory) and nonvolatile memory elements. Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 6, the software in the memory 110 includes methods described herein in accordance with exemplary embodiments and a suitable operating system (OS) 111. The OS 111 essentially controls the execution of other computer programs, such as the methods as described herein (e.g., in FIGS. 3-5), and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

Possibly, a conventional keyboard 150 and mouse 155 can be coupled to the input/output controller 135. Other I/O devices 140-155 may include other hardware devices.

In addition, the I/O devices 140-155 may further include devices that communicate both inputs and outputs. The unit 101 can further include a display controller 125 coupled to a display 130. In exemplary embodiments, the unit 101 can further include a network interface or transceiver 160 for coupling to the network 165.

The network 165 transmits and receives data between the unit 101 and external systems. The network 165 may possibly be implemented in a wireless fashion, e.g., using wireless protocols and technologies, such as Wi-Fi, WiMax, etc. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 165 can also be an IP-based network for communication between the unit 101 and any external server, client and the like via a broadband connection. In exemplary embodiments, network 165 can be a managed IP network administered by a service provider. Besides, the network 165 can be a packet-switched network such as a LAN, WAN, Internet network, etc.

If the unit 101 is a PC, workstation, intelligent device or the like, the software in the memory 110 may further include a basic input output system (BIOS). The BIOS is stored in ROM so that the BIOS can be executed when the computer 101 is activated.

When the unit 101 is in operation, the processor 105 is configured to execute software stored within the memory 110, to communicate data to and from the memory 110, and to generally control operations of the computer 101 pursuant to the software. The methods described herein and the OS 111, in whole or in part are read by the processor 105, typically buffered within the processor 105, and then executed. When the methods described herein are implemented in software, the methods can be stored on any computer readable medium, such as storage 120, for use by or in connection with any computer related system or method.

3.2 Computer Program Products

The present invention may be embodied as a computerized unit, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of units, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A method for connecting a device to a network, the method comprising:
providing a device assigned with a device identifier and an asymmetric cryptographic key pair that includes a public key and a private key, wherein the device:
stores the private key on a memory thereof; and
is provided with information as to at least one of the assigned device identifier and the public key, said information detectable by a detector so as to be transmissible to a server for the server to identify the device identifier and the public key assigned to the device; and
wherein the method further comprises, at the device:
receiving, at the device, from the server a signal encrypted with the public key of the device, wherein the signal invites the device to connect to a network, said signal encoding both:
the device identifier as identified by the server based at least in part on information transmitted to the server; and
a network identifier of said network, the network identifier encrypted with the public key of the device as identified by the server based at least in part on information transmitted to the server;
decrypting, utilizing the private key of the device, the signal to obtain the network identifier of the network; and
based at least in part on the network identifier, initiating a network connection with said network.

2. The method according to claim 1, wherein the method further comprises, prior to receiving said signal at the device:
  detecting said information from the device using said detector; and
  providing the detected information to the server, for the server to identify the device identifier and the public key.

3. The method according to claim 2, wherein the method further comprises, at the server:
  receiving information related to the information as detected by the detector; and
  identifying the device identifier and the public key based at least in part on the received information.

4. The method according to claim 3, wherein:
  identifying the device identifier and the public key at the server comprises entering the device identifier and the public key in an access database of the network.

5. The method according to claim 3, wherein:
  the method further comprises, at the server, and after having identified the device identifier and the public key: instructing one or more network access points of the network to transmit said signal.

6. The method according to claim 5, wherein:
  the method further comprises: transmitting said signal from at least one of the one or more network access points.

7. The method according to claim 6, wherein:
  the signal transmitted is beaconed by said at least one of the one or more network access points.

8. The method according to claim 1, wherein:
  the information provided with the device is encoded as a machine-readable optical label provided with the device; and
  detecting said information comprises optically reading the machine-readable optical label with said detector.

9. The method according to claim 8, wherein:
  the machine-readable optical label is exposed on one of:
    a surface of the device;
    a packaging of the device; and
    a documentation of the device.

10. The method according to claim 1, wherein:
  the network identifier encoded in the signal received by the device comprises one or more of:
    a basic service set identifier, or BSSID;
    a service set identifier, or SSID;
    a media access control address, or MAC address;
    an IP address of the network; and
    a public key of the network.

11. The method according to claim 1, wherein:
  initiating the network connection comprises an authentication operation based at least in part on a Wi-Fi Protected Access protocol, or WPA.

12. The method according to claim 11, wherein:
  said wireless application protocol is a WPA2 protocol.

13. The method according to claim 12, wherein:
  said wireless application protocol is one of:
    an extensible authentication protocol, or EAP; and
    an EAP transport layer security, or EAP-TLS.

14. The method according to claim 1, wherein the method further comprises, prior to providing the device:
  assigning the device with said device identifier and said asymmetric cryptographic key pair; and
  storing the private key on the memory of the device.

15. The method according to claim 14, wherein:
  the method further comprises, after assigning the device with said device identifier and said asymmetric cryptographic key pair: wrapping said device identifier and said public key in a certificate signed by a certification authority.

16. A method for connecting a device to a network, wherein:
  the device is assigned with a device identifier and an asymmetric cryptographic key pair, the latter comprising a public key and a private key;
  the device stores the private key on a memory thereof; and
  the device is provided with information as to at least one of the assigned device identifier and the public key, said information detectable by a detector so as to be transmissible to a server; and
  wherein the method comprises, at the server:
    upon receiving the information detected by the detector, identifying the device identifier and the public key assigned to the device based at least in part on the information received; and
    instructing to transmit to the device a signal encrypted at least in part with the public key of the device, wherein the signal invites the device to connect to a network;
  wherein the signal encodes both the device identifier as identified by the server and a network identifier of said network, the network identifier encrypted with the public key of the device as identified by the server;
  wherein the device is configured to decrypt the network identifier using the private key of the device and to initiate a network connection with said network based at least in part on the network identifier.

* * * * *